(12) United States Patent
Son (10) Patent No.: US 7,055,157 B2
(45) Date of Patent: May 30, 2006

(54) LOADING MOTOR CONTROL DEVICE OF OPTICAL DISC PLAYER

(75) Inventor: Byung-sam Son, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 459 days.

(21) Appl. No.: 10/439,176

(22) Filed: May 16, 2003

(65) Prior Publication Data

US 2004/0042352 A1    Mar. 4, 2004

(30) Foreign Application Priority Data

Sep. 3, 2002    (KR) ............................... 2002-52931

(51) Int. Cl.
  *G11B 17/03*    (2006.01)
  *G11B 21/08*    (2006.01)
(52) U.S. Cl. ............... 720/606; 720/631; 369/30.36
(58) Field of Classification Search ............... 720/606
See application file for complete search history.

(56) References Cited

U.S. PATENT DOCUMENTS

| | | | | |
|---|---|---|---|---|
| 4,772,965 A | * | 9/1988 | Kato et al. ............... 360/71 |
| 5,726,828 A | * | 3/1998 | Kakuta et al. ............ 360/98.01 |
| 5,726,967 A | * | 3/1998 | Tanaka et al. ............ 369/30.78 |
| 5,768,240 A | * | 6/1998 | Hiraga ........................ 720/656 |
| 5,793,564 A | * | 8/1998 | Nakase et al. ................ 360/92 |
| 5,878,011 A | * | 3/1999 | Nakamichi .................. 720/606 |
| 6,134,205 A | * | 10/2000 | Watanabe .................... 720/606 |
| 6,584,063 B1 | * | 6/2003 | Nagasaka et al. ........... 720/607 |

FOREIGN PATENT DOCUMENTS

KR    0166483    9/1998

* cited by examiner

*Primary Examiner*—Tan Dinh
(74) *Attorney, Agent, or Firm*—Staas & Halsey LLP (57) ABSTRACT

A loading motor control device of an optical device, which controls a loading motor to move a tray for loading or unloading a disc, and to raise and lower a pickup deck. The loading motor control device includes an optical sensor that has a light-emitting portion and a light-receiving portion, which are separated by a predetermined space and are face with each other; and a shutter that is provided on a sliding cam to move back and forth in the predetermined space, and that has a plurality of opening holes, through which a light beam emitted from the light-emitting portion passes, wherein the loading motor is controlled in multiple modes corresponding to the respective positions of the plurality of opening holes. The loading motor can be controlled adequately and correctly in multiple modes and with a simple structure.

36 Claims, 6 Drawing Sheets

FIG. 7

LOADING MOTOR CONTROL DEVICE OF OPTICAL DISC PLAYER

This application claims the priority of Korean Patent Application No. 2002-52931, filed on Sep. 3, 2002, in the Korean Intellectual Property Office, the disclosure of which is incorporated herein in its entirety by reference.

BACKGROUND OF THE INVENTION

1. Field of the Invention

The present invention relates to an optical disc player, and more particularly, to a loading motor control device of an optical disc player, which controls operation of a loading motor that conveys a tray to be loaded or unloaded, and controls motion of a pickup deck.

2. Description of the Related Art

Figure 1:
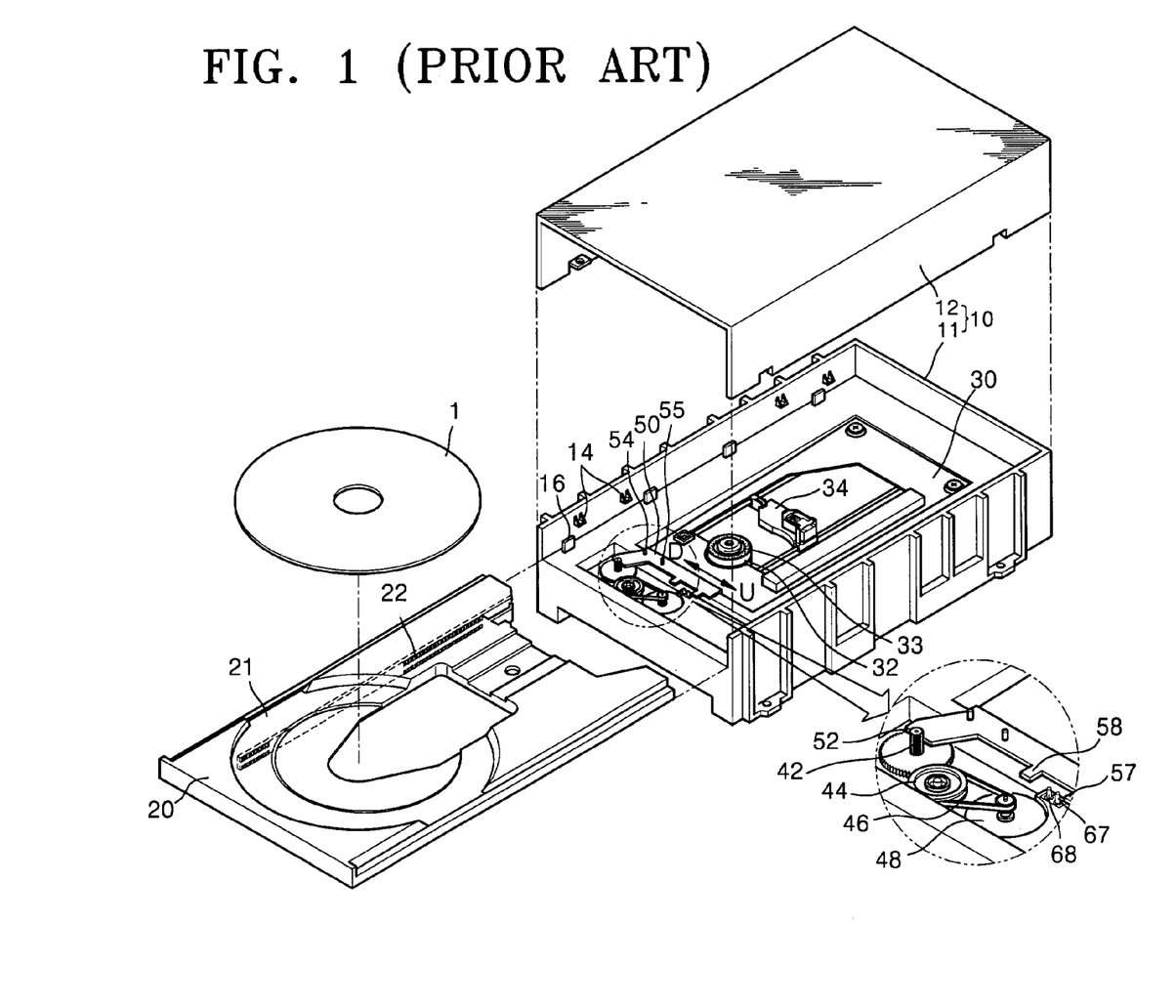
FIG. 1 is an exploded perspective view of a conventional optical disc player.
Figure 2:
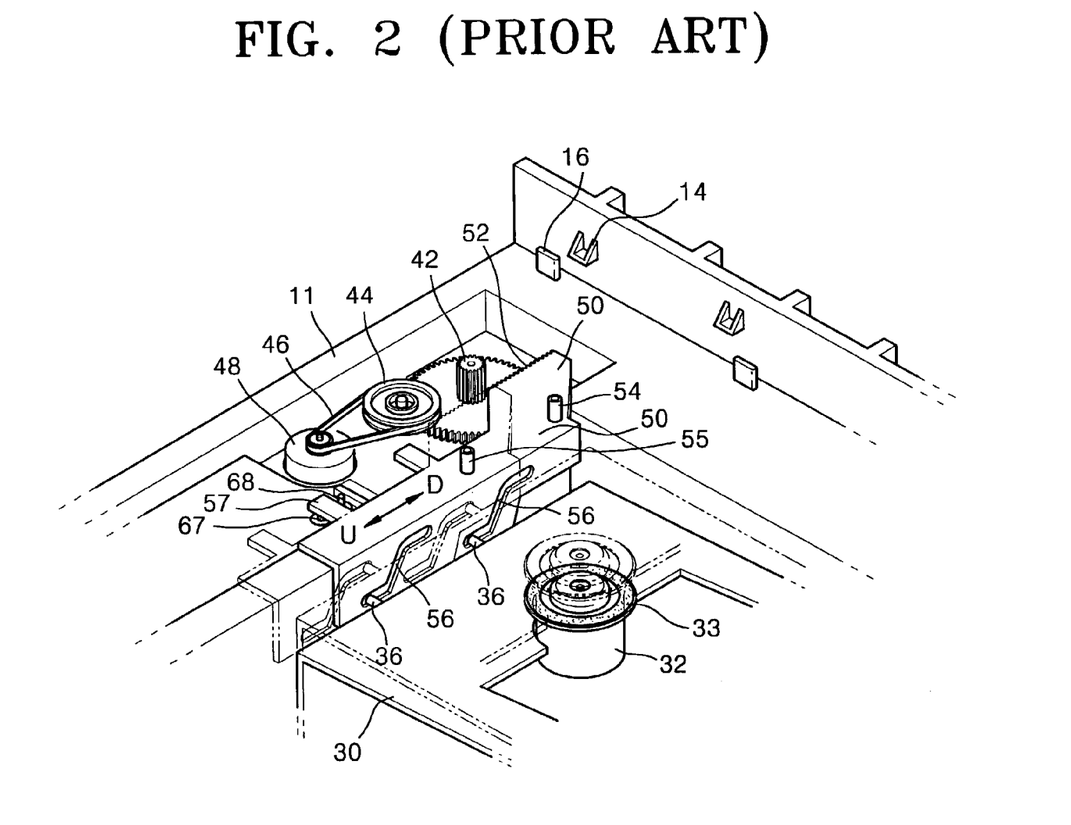
FIG. 2 is a partially enlarged perspective view of FIG. 1.
Figure 3:
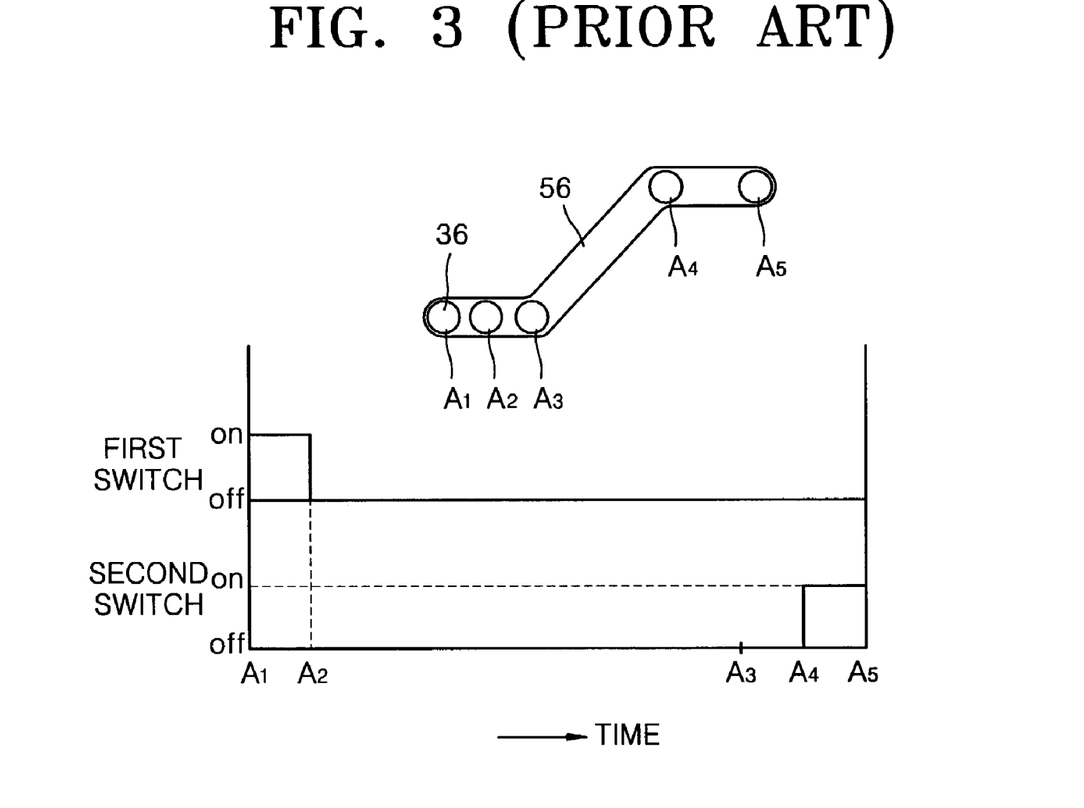
FIG. 3 is a reference drawing for explaining working modes of the conventional loading motor control device.

An optical disc player is an apparatus to record and reproduce information on and from a recording medium, such as a compact disc (CD), a digital video disc (DVD), etc., using an optical beam. FIG. 1 is an exploded perspective view of a conventional optical disc player. FIG. 2 is a partially enlarged perspective view of FIG. 1 for explaining operations of a conventional pickup deck lift device, including a conventional loading motor control device, and FIG. 3 is a reference drawing for explaining working modes of the conventional loading motor control device.

Referring to FIGS. 1 and 2, a conventional optical disc player has a housing 10 including a main frame 11, a cover plate 12 that is assembled onto the main frame 11, and a tray 20 to carry a disc 1 into and out of the housing 10. The disc 1 carried in by the tray 20 is placed onto a turntable 33 that is connected to a spindle motor 32. The spindle motor 32 is mounted on a pickup deck 30 that is connected to the main frame 11. An optical pickup 34, to record and reproduce information on and from the disc 1, is also mounted on the pickup deck 30.

The tray 20 includes a disc container 21 to place the disc 1 on. The tray 20 is moved in or out by a tray-conveying device that includes a tray-conveying rack gear 22, a pinion gear 42, a pulley gear 44, a belt 46, and a loading motor 48. The tray-conveying rack gear 22 is provided on a bottom surface of the tray 20, in a longitudinal direction thereof. The pinion gear 42 is mounted on the main frame 11, and engages the tray-conveying rack gear 22. The pulley gear 44 is also mounted on the main frame 11, and engages the pinion gear 42. The loading motor 48, which is also mounted on the main frame 11, drives and rotates the pulley gear 44 via the belt 46. Further, upper guides 14 and lower guides 16, to guide the tray 20 in and out of the housing 10, are provided on the main frame 11.

The pickup deck 30 has a rear end that is hinged with the main frame 11, and a front end that is engaged with a lift device mounted on the main frame 11. The pickup deck lift device includes a sliding cam 50 that is movably mounted on the main frame 11, and a pair of protrusions 36 that are formed on the front end of the pickup deck 30. Each of the protrusions 36 is respectively inserted into each of a pair of cam grooves 56 formed in the sliding cam 50. The protrusions 36 slide along the cam grooves 56. Specifically, the cam groves 56 have traces to raise and lower the protrusions 36 so that the protrusions 36 slide along the traces of the cam grooves 56 while the sliding cam 50 moves in a predetermined direction. In accordance with such sliding motions of the protrusions 36 along the cam grooves 56, the pickup deck 30 moves up and down.

The sliding cam 50 is moved by the loading motor 48 of the above-described tray-conveying device. A cam-conveying rack gear 52 is provided at an end of the sliding cam 50, and selectively engages the pinion gear 42 of the tray-conveying device to move the sliding cam 50. Further, there is provided a pair of projections, to serve as first and second guide pins 54 and 55, on an upper surface of the sliding cam 50, each of which is inserted into a corresponding guide groove (not shown) provided at the bottom of the tray 20.

In addition, the conventional optical disc player includes a control device to control the loading motor 48 while the disc 1 is loading and unloading. A conventional loading motor control device includes first and second switches, 67 and 68 respectively, mounted on the main frame 11, and first and second operation plates, 57 and 58 respectively, provided on the sliding cam 50. In accordance with motions of the sliding cam 50, the first and second operation plates 57 and 58 respectively activate the first and second switches 67 and 68.

Operation of the conventional optical disc player will be described with reference to FIGS. 1 to 3. Positions $A_1$ to $A_5$ correspond, respectively, to modes $A_1$ to $A_5$. When the tray 20 is in an open state, the sliding cam 50 is completely moved in the direction of arrow D, as shown in FIG. 2, and the protrusions 36 are located at lower portions of the cam grooves 56. Accordingly, the front end of the pickup deck 30 is in a lowered position. Further, the cam-conveying rack gear 52 is out of mesh with the pinion gear 42. This tray-open state is depicted as mode $A_1$ in FIG. 3. In mode $A_1$, the first switch 67 is pressed by the first operation plate 57, and produces a first control signal with which a system control unit (not shown) detects the open state of the tray 20.

After the disc 1 is placed in the tray 20, and when a disc-loading signal is applied from outside, e.g., from a load/eject switch, the loading motor 48 rotates and the tray 20 moves into the housing 10. When the tray 20 moves into the housing 10 by a predetermined longitudinal distance, e.g., about 8 mm, a first guide groove (not shown), provided on the bottom of the tray 20, interferes with the first guide pin 54. Accordingly, the sliding cam 50 moves by a first latitudinal distance in the direction of arrow U in FIG. 2. As the first operation plate 57 also moves by the first latitudinal distance in accordance with the motion of the sliding cam 50, the first switch 67 is switched off, and each of the protrusions 36 is placed in position $A_2$, as shown in FIG. 3. At this time, both of the switches 67 and 68 are in off states. During the period when each of the protrusions 36 is moving from position $A_1$ to position $A_2$ in FIG. 3, typically, a pulse voltage with a predetermined duty cycle is applied to the loading motor 48 to prevent the tray 20 from inclining due to a sudden motion of the tray 20. When each of the protrusions 36 reaches position $A_2$ and the first switch 67 turns off, however, a normal DC voltage is applied to the loading motor 48 so that the tray 20 moves constantly.

When the tray 20 accommodating the disc 1 is completely inserted into the housing 10, a second guide groove (not shown), provided on the bottom of the tray 20, interferes with the second guide pin 55, and the sliding cam 50 additionally moves a second latitudinal distance in the direction of the arrow U. In accordance with the additional motion of the sliding cam 50, the cam-conveying rack gear 52 engages the pinion gear 42. At this time, each of the protrusions 36 reaches position $A_3$ in FIG. 3. As the loading motor 48 continues to rotate, the sliding cam 50 continues to move in the direction of arrow U, and thus the protrusions 36 ascend along the cam grooves 56 to raise the pickup deck 30.

When each of the protrusions 36 completes the ascending motion and reaches position $A_4$ in FIG. 3, the pickup deck 30 is completely lifted, and the disc 1 is placed on the turntable 33. As previously noted, the turntable 33 is connected to the spindle motor 32, which is mounted on the pickup deck 30. At this time, the second switch 68 is switched on by the second operation plate 58 to produce a second control signal, so that the system control unit (not shown) detects that the tray 20 is closed and the disc 1 is loaded. Thereafter, the loading motor 48 continues to rotate, to keep moving the sliding cam 50, until each of the protrusions 36 reaches position $A_5$ in FIG. 3.

When a disc-unloading signal is applied from outside, e.g., the load/eject switch, while the tray 20 is in the closed state, the loading motor 48 rotates inversely, and accordingly, the sliding cam 50 moves in the direction of arrow D. Thereafter, unloading operations are performed inversely to the loading operations as described above.

As described herein above, the conventional loading motor control device includes a pair of switches 67 and 68 and a pair of operation plates 57 and 58 to detect whether the tray 20 is in an open state or in a closed state, and to control the loading motor 48 in two modes, i.e., a tray open mode and a tray close mode. As the control modes of the conventional loading motor control device are very simple and are limited corresponding to the number of switches, it is difficult to control the loading motor 48 at various time and in various ways. For example, while the pickup deck 30 is being raised or lowered, a much higher voltage should be applied to the loading motor 48. However, such voltage control is difficult with the conventional loading motor control device. Further, it is difficult to detect accurate timing with limited position information, and it is difficult to adequately control duty cycles of control signals. Moreover, to increase the number of control modes, the structure of the device becomes complicated because additional switches and operation plates must be included. Furthermore, in the conventional loading motor control device, since the operation plates 57 and 58 interfere with upper portions of the switches 67 and 68, respectively, to switch the switches 67 and 68, it is difficult to determine relative positions and heights between the operational plates and the switches.

SUMMARY OF THE INVENTION

The present invention provides a loading motor control device of an optical disc player, which has a simple structure that includes an optical sensor and a shutter having a plurality of opening holes, and controls a loading motor adequately and correctly in multiple modes.

According to one aspect, the loading motor control device controls a loading motor, which moves a tray into and out of a housing to load and unload a disc, moves a sliding cam that is movably mounted on a main frame of the housing, and moves a pickup deck up and down. The loading motor control device includes: an optical sensor, that is fixed to the main frame and that has a light-emitting portion and a light-receiving portion, which are separated with a predetermined space and face each other; and a shutter, that is provided on the sliding cam and moves back and forth between the light-emitting portion and the light-receiving portion of the optical sensor, and that has a plurality of opening holes formed in a line, through which a light beam emitted from the light-emitting portion of the optical sensor passes. The loading motor is controlled with multiple modes corresponding to the respective positions of the plurality of opening holes.

According to one aspect, the shutter has at least four opening holes, so that at least four loading motor control modes are available.

According to one aspect, the loading motor control modes include a tray open mode in which the tray is completely open, a pickup deck ascending-start mode in which the tray is inserted into the housing and the pickup deck starts to ascend, a pickup deck ascending-end mode in which the pickup deck completes to ascend, and a tray close mode in which the tray is completely closed.

According to another aspect, the loading motor control modes additionally include a voltage conversion mode in which a voltage to be applied to the loading motor is converted between the tray open mode and the pickup deck ascending-start mode.

According to the present invention, the loading motor has a simple structure, and can be controlled adequately and correctly in multiple modes.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE INVENTION

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

A loading motor control device according to an embodiment of the present invention will be described with reference to FIGS. 4 to 7. The loading motor control device is incorporated in an optical disc player to record and reproduce information on and from a recording medium, such as a CD, DVD, etc., using an optical beam.

Figure 4:
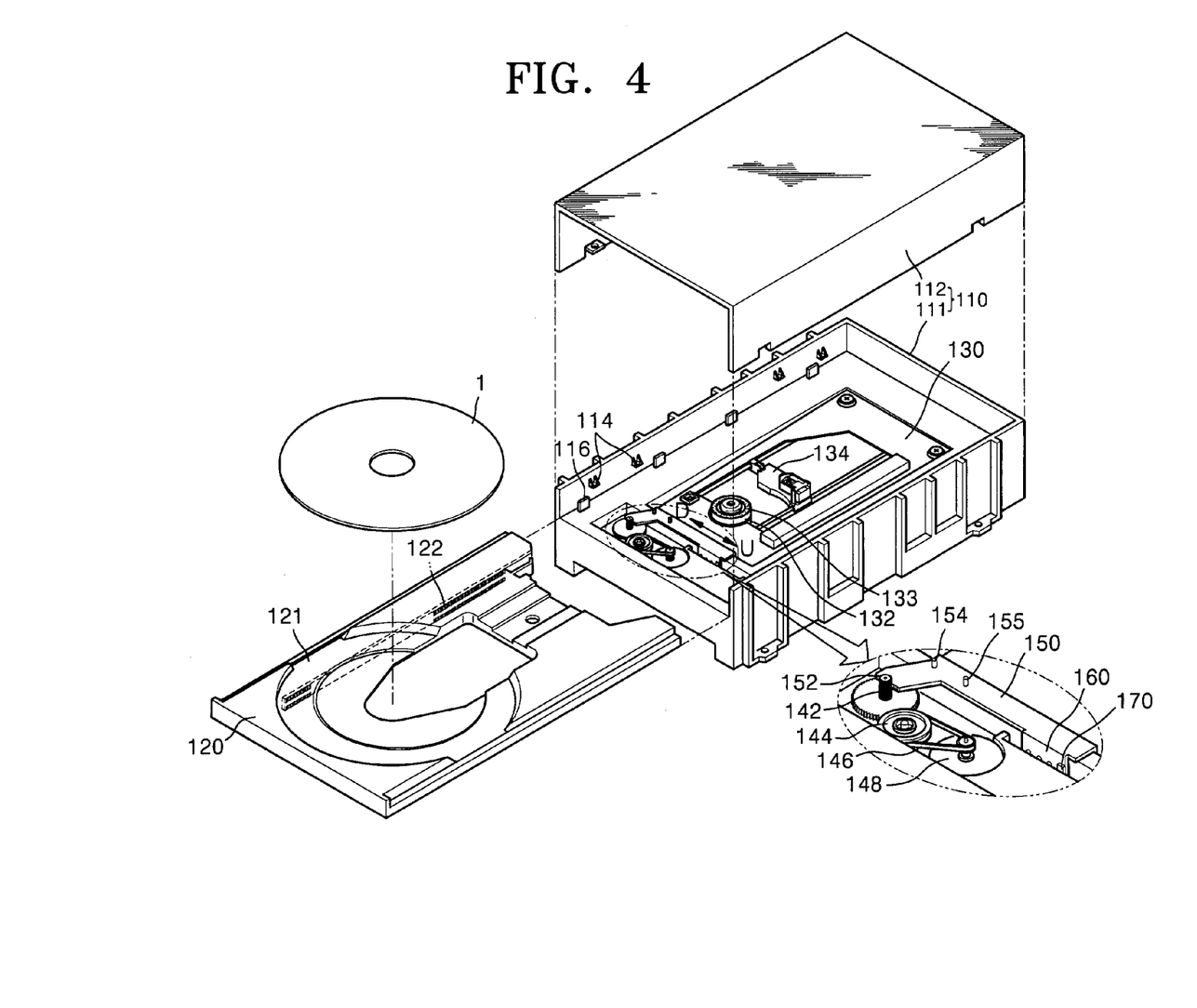
FIG. 4 is an exploded perspective view of an optical disc player according to an embodiment of the present invention.
Figure 5:
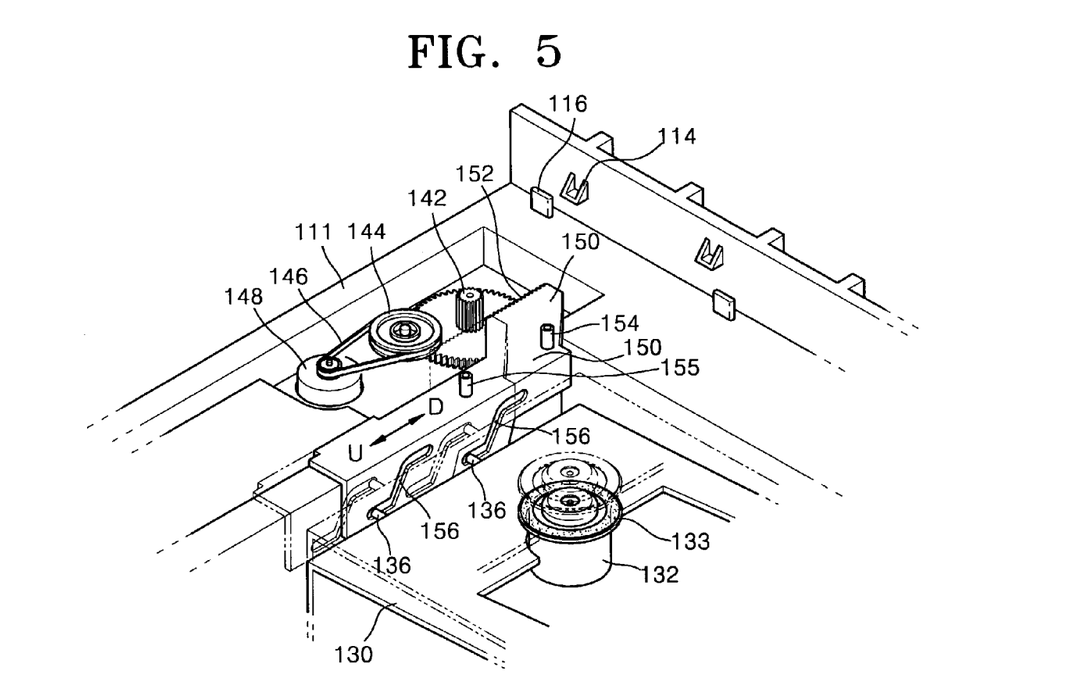
FIG. 5 is a partially enlarged perspective view of FIG. 4.

The optical disc player including the loading motor control device is shown in FIG. 4 in an exploded perspective view. FIG. 5 is a partially enlarged perspective view of FIG. 4 for explaining operation of a pickup deck lift device, and FIG. 6 is a partially enlarged perspective view of FIG. 4 for showing in detail the loading motor control device.

Figure 6:
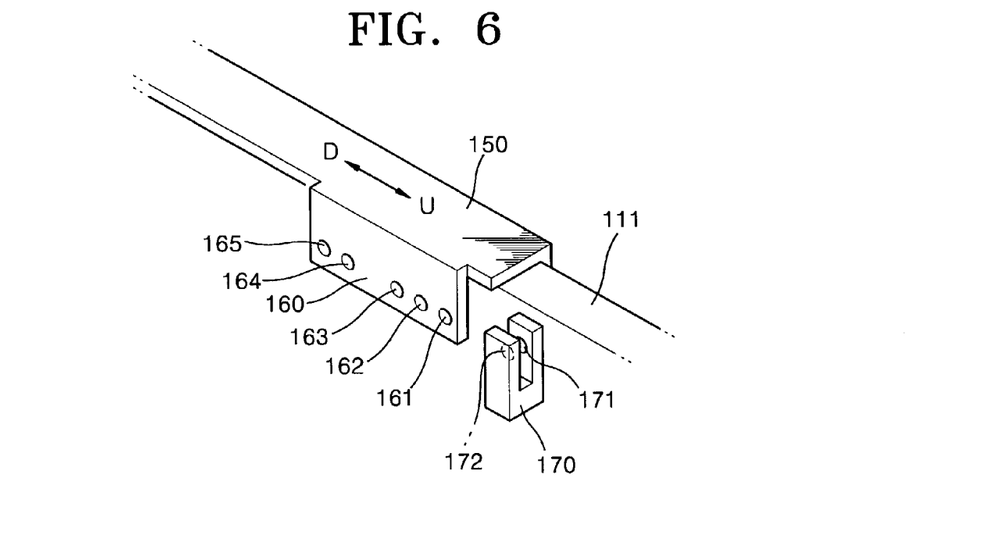
FIG. 6 is a partially enlarged perspective view of FIG. 4.

Referring to FIGS. 4 to 6, the optical disc player has a tray 120 that moves into and out of a housing 110 to convey a disc 1 such as CD or DVD placed thereon. The housing 110 includes a main frame 111, and a cover plate 112 that is assembled onto the main frame 111. A pickup deck 130, which includes a spindle motor 132 to rotate the disc 1 and an optical pickup 134 to record and reproduce information on and from the disc 1, is connected to the main frame 111. A rear end of the pickup deck 130 is hinged with the main frame 111, and a front end thereof, on which the spindle motor 132 is mounted, is engaged with a pickup deck lift device mounted on the main frame 111. The pickup deck 130 is lifted in accordance with motions of the pickup deck lift device. A turntable 133 to accommodate the disc 1 is connected to the spindle motor 132.

The tray 120 includes a disc container 121 into which the disc 1 is placed. The tray 120 is moved in and out by a tray-conveying-device that includes a tray-conveying rack gear 122, a pinion gear 142, a pulley gear 144, a belt 146, and a loading motor 148. The tray-conveying rack gear 122 is provided on a bottom surface of the tray 120 in a longitudinal direction thereof. The pinion gear 142 is mounted on the main frame 111, and engages the tray-conveying rack gear 122. The pulley gear 144 is also mounted on the main frame 111, and engages the pinion gear 142. The loading motor 148, which is also mounted on the main frame 111, drives and rotates the pulley gear 144 via the belt 146. Further, upper guides 114 and lower guides 116, to guide the tray 120 in and out of the housing 110 are provided in the main frame 111.

The pickup deck lift device includes a sliding cam 150 that is movably mounted on the main frame 111, and a pair of protrusions 136 that are formed on the front end of the pickup deck 130. The sliding cam 150 is moved by the loading motor 148. For this purpose, a cam-conveying rack gear 152 is provided at an end of the sliding cam 150 and engages the pinion gear 142. Further, there is provided a pair of cam grooves 156, into which a pair of protrusions 136 is inserted, at one side of the sliding cam 150. The cam grooves have traces to move the protrusions 136 up and down, along the cam grooves 156 when the sliding cam 150 moves in a predetermined direction. Further, there is provided a pair of projections to serve as first and second guide pins 154 and 155 on an upper surface of the sliding cam 150, each of which is inserted into a corresponding guide grove (not shown) provided at the bottom of the tray 120.

The loading motor control device controls the loading motor 148 that moves the tray 120 to load and unload the disc 1, and moves the sliding cam 150 to move the pickup deck 130 up and down. The loading motor control device includes an optical sensor 170 that is fixed to the main frame 111, and a shutter 160 provided at the sliding cam 150.

The optical sensor 170 has a light-emitting portion 171 and a light-receiving portion 172, which are separated by a predetermined distance and face each other. The shutter 160 moves back and forth between the light-emitting portion 171 and the light-receiving portion 172 of the optical sensor 170 in accordance with back and forth motions of the sliding cam 150. A plurality of opening holes 161 to 165 are located on the shutter 160 in a line along the moving direction of the shutter 160, such that when each of the opening holes passes the light emitting portion 171, a light beam emitted from the light-emitting portion 171 of the optical sensor 170 passes through the opening and reaches the light receiving portion 172. As the light beam emitted from the light-emitting portion 171 of the optical sensor 170 is shut by the shutter 160 or passes through any one of the plurality of the opening holes 161 to 165 to reach the light receiving portion 172, in accordance with the motions of the shutter 160, the optical sensor 170 produces a control signal.

The shutter 160 includes at least four opening holes, and preferably includes five, as shown in FIG. 6 with reference numerals 161 to 165. According to one aspect, the shutter 160 may include six or more opening holes. Therefore, the optical sensor 170 produces a plurality of control signals sequentially corresponding to the number of the opening holes. More specifically, in accordance with the motions of the sliding cam 150 and the shutter 160, the light beam emitted from the light-emitting portion 171 of the optical sensor 170 sequentially passes through the plurality of the opening holes 161 to 165, and the optical sensor 170 produces a control signal corresponding to respective positions of a plurality of the opening holes 161 to 165, through which the light beam passes. In response to the control signal from the optical sensor, a system control unit (not shown) detects the position of the sliding cam 150 to control the loading motor 148 in multiple control modes.

The number of the control modes of the loading motor 148 is determined by the number of the opening holes. Thus, if there are four opening holes in the shutter 160, at least four control modes are available. And if there are five opening holes 161 to 165 in the shutter 160, as shown in FIG. 6, at least five control modes are available. For example, in a case of four opening holes, there may be at least four control modes including: a tray open mode in which the tray 120 is completely open; a pickup deck ascending-start mode, in which the tray 120 is inserted into the housing 110 and the pickup deck 130 starts to ascend; a pickup deck ascending-end mode, in which the pickup deck 130 is completely raised; and a tray close mode, in which the tray is completely closed. Further, in a case of five opening holes 161 to 165, as shown in FIG. 6, there may be at least five control modes including the above-described four modes and a voltage conversion mode, in which a voltage applied to the loading motor 148 is converted between the tray open mode and the pickup deck ascending-start mode. Detailed descriptions on the control modes will be provided herein below.

As describe above, according to the present invention, additional control modes of the loading motor 148 are created by increasing the number of the opening holes 161 to 165 formed in the shutter 160, so that the loading motor 148 is more accurately controlled.

Figure 7:
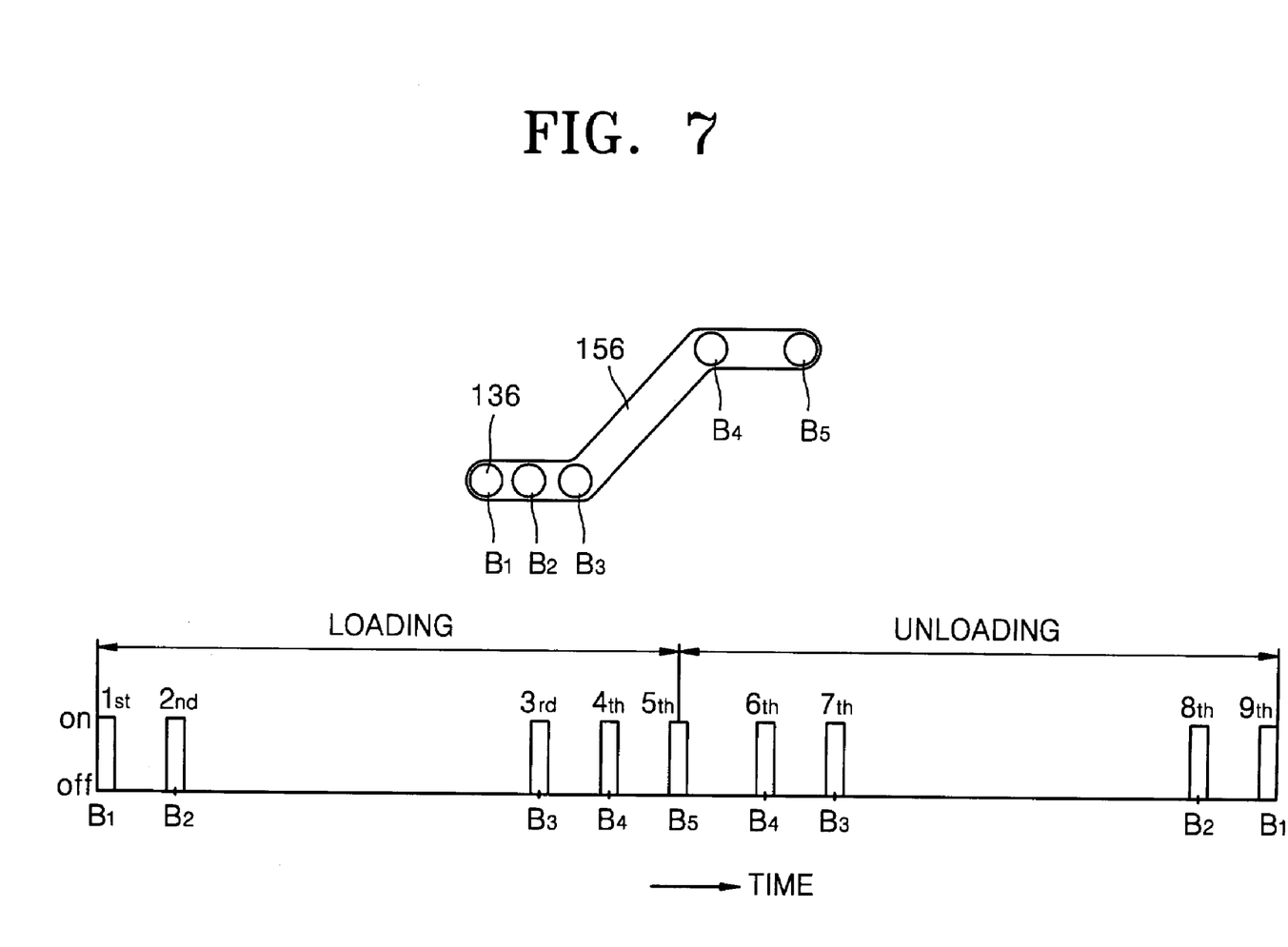
FIG. 7 is a reference drawing for explaining working modes of the loading motor control device according to an embodiment of the present invention.

The control modes of the loading motor control device according to the preferred embodiment of the present invention will be described with reference to FIGS. 4 to 7. FIG. 7 is a reference drawing for explaining the control modes of the loading motor control device. Positions $B_1$ to $B_5$ respectively correspond to modes $B_1$ to $B_5$ When the tray 120 is in an open state, the sliding cam 150 is completely moved in a direction of arrow D, as shown in solid line in FIG. 5, and the protrusions 136 are located at lower portions of the cam grooves 156. Accordingly, the front end of the pickup deck 130 is in a lowered position. Further, the cam-conveying rack gear 152 is out of mesh with the pinion gear 142. This tray-open state is depicted as mode $B_1$ in FIG. 3. In mode $B_1$, a first opening hole 161 of the shutter 160 is located between the light-emitting portion 171 and the light-receiving portion 172 of the optical sensor 170 so that the light beam emitted from the light-emitting portion 171 passes through the first opening hole 161 to reach the light-receiving portion 172, and the optical sensor 170 produces a first control signal. Accordingly, the system control unit (not shown) detects that the tray 120 is in a completely open state, and keeps the loading motor 148 in a non-operational state. This mode is defined as a tray open mode in the preferred embodiment of the present invention.

After the disc 1 is placed on the tray 120 and when a tray-loading signal is applied from outside, e.g., a load/eject switch, the loading motor 148 rotates and the tray 120 moves into the housing 110. At this time, typically, a pulse voltage with a predetermined duty cycle is applied to the loading motor 148 to prevent the tray 120 from inclining due to a sudden motion of the tray 120. When the tray 120 moves into the housing 110 by a predetermined longitudinal distance, a first guide groove (not shown) provided at the bottom of the tray 120 interferes with the first guide pin 154, and the sliding cam 150 moves by a first latitudinal distance in a direction of arrow U in FIG. 5. Accordingly, each of the protrusions 136 is shifted to position $B_2$, as shown in FIG. 7, and a second opening hole 162 of the shutter 160 is located between the light-emitting portion 171 and the light-receiving portion 172 of the optical sensor 170, so that the light beam emitted from the light-emitting portion 171 passes through the second opening hole 162, and the optical sensor 170 produces a second control signal. In response to the second control signal, the system control unit (not shown) converts the pulse voltage applied to the loading motor 148 into a normal DC voltage.

According to another aspect, the system control unit may convert the pulse voltage with a predetermined duty cycle into a pulse voltage with a different duty cycle, and after a predetermined time period, additionally convert into a pulse voltage with another duty cycle or into a normal DC voltage. In the present embodiment, this mode is defined as a voltage conversion mode.

When the tray 120 accommodating the disc 1 continues to move, and is completely inserted into the housing 110, a second guide groove (not shown) provided at the bottom of the tray 120 interferes with the second guide pin 155, and the sliding cam 150 additionally moves by a second latitudinal distance in the direction of the arrow U. In accordance with the additional motion of the sliding cam 150, the cam-conveying rack gear 152 engages the pinion gear 142. At this time, each of the protrusions 136 moves to position $B_3$, as shown in FIG. 7, and a third opening hole 163 of the shutter 160 is placed between the light-emitting portion 171 and the light-receiving portion 172 of the optical sensor 170, so that the light beam emitted from the light-emitting portion 171 passes through the third opening hole 163, and the optical sensor 170 produces a third control signal. As the loading motor 148 continues to rotate, the sliding cam 150 continues to move in the direction of arrow U, and the protrusions 136 start to ascend along the cam grooves 156, to lift up the pickup deck 130. In response to the third control signal, the system control unit (not shown) increases the voltage applied to the loading motor 148, to increase a driving force of the loading motor 148, so that the pickup deck 130 is smoothly lifted. This mode is defined as a pickup deck ascending-start mode in the present embodiment.

When each of the protrusions 136 completes the ascending motion and reaches position $B_4$, as shown, in FIG. 7, the pickup deck 130 is completely raised, and the disc 1 is placed on the turntable 133. As previously noted, the turntable 133 is connected to the spindle motor 132, which is mounted on the pickup deck 130. At this time, a fourth opening hole 164 of the shutter 160 is located between the light-emitting portion 171 and the light-receiving portion 172 of the optical sensor 170, so that the light beam emitted from the light-emitting portion 171 passes through the fourth opening hole 164 and the optical sensor 170 produces a fourth control signal. In response to the fourth control signal, the system control unit (not shown) detects that the pickup deck 130 is completely raised and the disc 1 is loaded, and decreases the voltage applied to the loading motor 148. This mode is defined as a pickup deck ascending-end mode in the present embodiment.

Thereafter, the loading motor 148 continues to rotate, to keep moving the sliding cam 150, until each of the protrusions 136 reaches position $B_5$, as shown in FIG. 7. At this time, a fifth opening hole 165 of the shutter 160 is located between the light-emitting portion 171 and the light-receiving portion 172 of the optical sensor 170, so that the light beam emitted from the light-emitting portion 171 passes through the fifth opening hole 165 and the optical sensor 170 produces a fifth control signal. In response to the fifth control signal, the system control unit (not shown) detects that the tray 120 is completely closed, and stops the operation of the loading motor 148. This mode is defined as a tray close mode in the present embodiment.

When the disc 1 is unloaded, unloading operations are performed inversely to the loading operations as described above. Specifically, when a disc-unloading signal is applied from outside, e.g., the load/eject switch, while the tray 120 is in the closed state, the loading motor 148 rotates inversely, and accordingly, the sliding cam 150 moves in the direction of arrow D in FIG. 5. When the sliding cam 150 moves in the direction of arrow D and each of the protrusions 136 reaches position $B_4$, as shown in FIG. 7, the fourth opening hole 164 of the shutter 160 is placed between the light-emitting portion 171 and the light-receiving portion 172 of the optical sensor 170, so that the light beam emitted from the light-emitting portion 171 passes through the fourth opening hole 164 and the optical sensor 170 produces a sixth control signal. At this time, since the protrusions 136 are descending along the cam grooves 156, the pickup deck 130 descends and the disc 1 separates from the turntable 133 of the spindle motor 132. The system control unit (not shown) increases the voltage applied to the loading motor 148 in response to the sixth control signal, so that the driving force of the loading motor 148 is increased and, accordingly, the separation of the disc from the turntable 133 and the descent of the pickup deck 130 are performed smoothly. This mode is defined as a pickup deck descending-start mode in the present embodiment. As described above, the pickup deck ascending-end mode for loading the disc 1 is converted into the pickup deck descending-start mode for unloading the disc 1.

When the sliding cam 150 continues to move in the direction of arrow D in FIG. 5, and accordingly, the protrusions 136 are completely lowered to reach position $B_3$, as shown in FIG. 7, the pickup deck 130 is completely lowered. At this time, the third opening hole 163 of the shutter 160 is placed between the light-emitting portion 171 and the light-receiving portion 172 of the optical sensor 130, so that the light beam emitted from the light-emitting portion 171 passes through the third opening hole 163 and the optical sensor 170 produces a seventh control signal. In response to the seventh control signal, the system control unit (not shown) detects that the pickup deck 130 is completely lowered, and decreases the voltage applied to the loading motor 148. This mode may be defined as a pickup deck descending-end mode in the present embodiment. As described above, the pickup deck ascending-start mode for loading the disc 1 is converted into the pickup deck descending-end mode for unloading the disc 1.

When the tray 120 starts to open, the second guide groove (not shown) provided at the bottom of the tray 120 interferes with the second guide pin 155, and the sliding cam 150 moves by the second latitudinal distance in the direction of arrow D in FIG. 5, so that the cam-conveying rack gear 152 is out of mesh from the pinion gear 142. At this time, each of the protrusions 130 is shifted to position $B_2$ in FIG. 7, and the second opening hole 162 of the shutter 160 is placed between the light-emitting portion 171 and the light-receiving portion 172 of the optical sensor 170, so that the light beam emitted from the light-emitting portion 171 passes through the second opening hole 162 and the optical sensor 170 produces an eighth control signal. Since there is no need to apply a pulse voltage, (which was required for initially moving the tray 120 for loading the disc 1) to the loading motor 148, a mode corresponding to the voltage conversion mode for loading the disc 1 is not required for unloading the disc 1. Instead, the system control unit (not shown) applies a DC voltage to the loading motor 148 that is less than the DC voltage that was applied in the pickup deck descending-end mode.

When the tray 120 is completely open, the first guide groove (not shown) provided at the bottom of the tray 120 interferes with the first guide pin 154 to completely move the sliding cam 150 in the direction of arrow D in FIG. 5. At this time, each of the protrusions 136 are shifted to position $B_1$, as shown in FIG. 7, and the first opening hole 161 of the shutter 160 is located between the light-emitting portion 171 and the light-receiving portion 172 of the optical sensor 170, so that the light beam emitted from the optical sensor 170 passes through the first opening hole 161 and the optical sensor 170 produces a ninth control signal. In response to the ninth control signal, the system control unit (not shown) detects that the tray 120 is completely open, and stops the operation of the loading motor 148. Accordingly, the system enters the tray open mode again.

The loading motor control device of an optical disc player according to the present invention has the following features. First, the control device controls the loading motor adequately, correctly, and precisely, in multiple modes with an optical sensor and a shutter having a plurality of opening holes. That is, the control device applies a much higher voltage to the loading motor 148 while the pickup deck 130 is ascending and descending, detects correct timing using various positional information, and controls more duty cycles than a conventional optical disc player.

Second, as only one optical sensor and only one shutter are used, the structure of the loading motor control device is simple, and additional control modes can be provided by simply increasing the number of the opening holes of the shutter. Further, compared with the conventional loading motor control device using plates and switches, there is no difficulty in adjusting the relative heights and positions of the elements of the loading motor control device.

While the present invention has been particularly shown and described with reference to preferred embodiments thereof, it will be understood by those of ordinary skill in the art that various changes in form and details may be made therein without departing from the spirit and scope of the present invention, the scope of which is defined in the claims and their equivalents.

What is claimed is:

1. A loading motor control device of an optical disc player, which controls a loading motor that moves a tray into and out of a housing to load and unload a disc, moves a sliding cam that is movably mounted on a main frame of the housing, and moves a pickup deck up and down, the loading motor control device comprising:
an optical sensor that is fixed to the main frame, and that has a light-emitting portion and a light-receiving portion, which are separated by a predetermined space and face each other; and
a shutter that is provided on the sliding cam that moves back and forth between the light-emitting portion and the light-receiving portion of the optical sensor, and that has a plurality of opening holes formed in a line, through which a light beam emitted from the light-emitting portion of the optical sensor passes,
wherein the loading motor is controlled in multiple modes corresponding to the respective positions of the plurality of opening holes, through which the light beam emitted from the light-emitting portion of the optical sensor sequentially passes.

2. The loading motor control device according to claim 1, wherein:
the shutter has at least four opening holes, and the loading motor has at least four loading motor control modes.

3. The loading motor control device according to claim 2, wherein the loading motor control modes comprise:
a tray open mode, in which the tray is completely open;
a pickup deck ascending-start mode, in which the tray is inserted into the housing and the pickup deck starts to ascend;
a pickup deck ascending-end mode, in which the pickup deck is completely raised; and
a tray close mode, in which the tray is completely closed.

4. The loading motor control device according to claim 3, wherein the loading motor control modes further comprises:
a voltage conversion mode, in which a voltage applied to the loading motor is converted between the tray open mode and the pickup deck ascending-start mode.

5. The loading motor control device according to claim 4, wherein:
during the voltage conversion mode, a pulse voltage is converted to a DC voltage.

6. The loading motor control device according to claim 4, wherein:
during the voltage conversion mode, a pulse voltage of a first predetermined duty cycle is converted to a pulse voltage of a second predetermined duty cycle.

7. The loading motor control device according to claim 3, wherein:
the loading motor comprises:
a motor, and
a pinion gear that is selectively rotated by the motor; and
the sliding cam comprises a cam conveying rack gear,
wherein during the pickup deck ascending-start mode, the cam-conveying rack gear engages the pinion gear that is rotated by the loading motor, and the pickup deck ascends in accordance with the motion of the sliding cam.

8. A loading motor control device that controls an output of a loading motor of an optical disc player, comprising:
an optical sensor, having
a light emitting portion that emits a light beam, and
a light receiving portion that receives the light beam; and
a shutter that has a hole, through which the light beam passes and reaches the light receiving portion,
wherein the shutter is moved by the loading motor and prevents the light beam from reaching the light receiving portion as the shutter is moved by the loading motor, except when the hole passes between the light emitting portion and the light receiving portion, and control of changes in the output of the loading motor corresponds to the respective position of the hole on the shutter.

9. The loading motor control device according to claim 8, wherein:
the shutter has a plurality of holes.

10. The loading motor control device according to claim 9, wherein:
as the light beam reaches the light receiving portion by passing through each of the holes, and is prevented from reaching the light receiving portion, in accordance with motion of the shutter, the optical sensor produces a control signal.

11. The loading motor control device according to claim 9, wherein:
the optical sensor produces a plurality of control signals sequentially corresponding to the plurality of holes.

12. The loading motor control device according to claim 10, further comprising
a system control unit that connects to the optical sensor and the loading motor,
wherein in response to the control signal received from the optical sensor, the system control unit changes a mode of the loading motor.

13. The loading motor control device according to claim 12, wherein:
the optical disc player has a sliding cam; and
the shutter is located on the sliding cam,
wherein in response to the control signal received from the optical sensor, the system control unit detects the position of the sliding cam, and changes a mode of the loading motor based on the position of the sliding cam.

14. The loading motor control device according to claim 13, wherein:
the shutter has at least first through fourth holes; and
the loading motor has at least four modes.

15. The loading motor control device according to claim 14, wherein the optical disc player has a tray that moves in and out of a housing to load and unload a disc, and also has a pickup deck that moves within the housing to engage the disc, and the loading motor modes comprise:
a tray open mode, in which the tray is completely open;
a pickup deck engaging-start mode, in which the tray is inserted into the housing and the pickup deck starts to move from a first position to a second position;
a pickup deck engaging-end mode, in which the pickup deck reaches the second position; and
a tray closed mode, in which the tray is completely closed.

16. The loading motor control device according to claim 15, wherein:
when the system control unit receives a tray-loading signal during the tray open mode, the system control unit applies a pulse voltage to the control motor.

17. The loading motor control device according to claim 15, wherein:
during the pickup deck engaging-start mode, the system control unit applies a first DC voltage to the loading motor.

18. The loading motor control device according to claim 15, wherein:
during the pickup deck engaging-end mode, the system control unit applies a second DC voltage to the loading motor that is less than the first DC voltage.

19. The loading motor control device according to claim 15, wherein:
during the tray closed mode, the system control unit stops operation of the loading motor.

20. The loading motor control device according to claim 15, wherein:
the loading motor comprises:
a motor, and
a pinion gear that is selectively rotated by the motor; and
the sliding cam comprises a cam conveying rack gear,
wherein during the pickup deck engaging-start mode, the cam-conveying rack gear engages the pinion gear that is rotated by the loading motor, and the pickup deck moves from a first position to a second position in accordance with the motion of the sliding cam.

21. The loading motor control device according to claim 15, wherein the loading motor comprises:
a motor that rotates in a first direction,
wherein when the system control unit receives a tray-loading signal during the tray open mode,
the system control unit applies a pulse voltage to the control motor,
the motor moves the tray into the housing, and
the sliding cam moves from a position where the light beam passes through the first hole, to a position where the light beam passes through the second hole.

22. The loading motor control device according to claim 21, wherein:
the loading motor further comprises a pinion gear that is selectively rotated by the motor; and
the sliding cam comprises a cam conveying rack gear,
wherein during the pickup deck engaging-start mode,
the system control unit applies a first DC voltage to the loading motor,
the cam-conveying rack gear engages the pinion gear that is rotated by the loading motor,
the pickup deck moves from a first position to a second position in accordance with the motion of the sliding cam, and
the sliding cam moves from a position where the light beam passes through the second hole, to a position where the light beam passes through the third hole.

23. The loading motor control device according to claim 22, wherein during the pickup deck engaging-end mode:
the system control unit applies a second DC voltage to the loading motor that is less than the first DC voltage; and
the sliding cam moves from a position where the light beam passes through the third hole, to a position where the light beam passes through the fourth hole.

24. The loading motor control device according to claim 23, wherein:
when the sliding cam moves from a position where the light beam passes through the third hole, to a position where the light beam passes through the fourth hole, the loading motor enters the tray closed mode, in which the system control unit stops operation of the loading motor.

25. The loading motor control device according to claim 24, wherein when the system unit receives a tray open signal during the tray closed mode:
the system control unit applies the second DC voltage to the motor;
the motor rotates in a second direction, opposite to the first direction;
the cam conveying rack gear engages the pinion gear that is rotated by the loading motor; and
the sliding cam moves from a position where the light beam passes through the fourth hole, to a position where the light beam passes through third the hole.

26. The loading motor control device according to claim 24, wherein the loading motor modes further comprise:
a pickup deck disengaging start mode; and
a pickup deck disengaging end mode.

27. The loading motor control device according to claim 26, wherein during the pickup deck disengaging start mode:
the system control unit applies the first DC voltage to the loading motor;
the loading motor moves the sliding cam moves from a position where the light beam passes through the third hole, to a position where the light beam passes through second the hole; and
the pickup deck moves from the second position to the first position in accordance with the motion of the sliding cam.

28. The loading motor control device according to claim 27, wherein during the pickup deck disengaging end mode:
the system control unit applies the second DC to the control motor,
the motor moves the tray out of the housing, and
the sliding cam moves from a position where the light beam passes through the second hole, to a position where the light beam passes through the first hole.

29. The loading motor control device according to claim 28, wherein:
when the sliding cam moves from a position where the light beam passes through the second hole, to a position where the light beam passes through the first hole, the loading motor enters the tray open mode, in which the system control unit stops operation of the loading motor.

30. The loading motor control device according to claim 15, wherein the loading motor modes further comprise:
a voltage conversion mode, in which a voltage applied to the loading motor is converted between the tray open mode and the pickup deck engaging-start mode.

31. The loading motor control device according to claim 30, wherein:
during the voltage conversion mode, a pulse voltage is converted to a DC voltage.

32. The loading motor control device according to claim 31, wherein:
during the voltage conversion mode, a pulse voltage of a first predetermined duty cycle is converted to a pulse voltage of a second predetermined duty cycle.

33. The loading motor control device according to claim 29, wherein:
the loading motor modes further comprise a voltage conversion mode; and
the shutter comprises a fifth hole, located between the first and second holes,
wherein when the sliding cam moves to a position where the light beam passes through the fifth hole, the loading motor enters the voltage conversion mode.

34. The loading motor control device according to claim 33, wherein:
during the voltage conversion mode, the voltage is converted between a pulse voltage and a DC voltage.

35. The loading motor control device according to claim 34, wherein:
during the voltage conversion mode, the voltage is converted between a pulse voltage of a first predetermined duty cycle and a pulse voltage of a second predetermined duty cycle.

36. A loading motor control device that controls an output of a loading motor of an optical disc player, comprising:
only one optical sensor, having
a light emitting portion that emits a light beam, and
a light receiving portion that receives the light beam; and
only one shutter that has a plurality of holes, through which the light beam passes and reaches the light receiving portion,
wherein the shutter is moved by the loading motor, and control of changes in the output of the loading motor corresponds to the respective position of the plurality holes.

* * * * *

UNITED STATES PATENT AND TRADEMARK OFFICE
CERTIFICATE OF CORRECTION

PATENT NO. : 7,055,157 B2  Page 1 of 1
APPLICATION NO. : 10/439176
DATED : May 30, 2006
INVENTOR(S) : Byung-sam Son It is certified that error appears in the above-identified patent and that said Letters Patent is hereby corrected as shown below:

Column 12, Line 67, change "third the hole." to --the third hole.--

Column 13, Line 12, change "second the hole;" to --the second hole;--.

Signed and Sealed this

Twenty-eighth Day of November, 2006

JON W. DUDAS
*Director of the United States Patent and Trademark Office*